(12) United States Patent
Kim (10) Patent No.: US 11,764,504 B2
(45) Date of Patent: Sep. 19, 2023

(54) CONNECTOR

(71) Applicant: LG Energy Solution, Ltd., Seoul (KR)

(72) Inventor: Sung-Gyu Kim, Daejeon (KR)

(73) Assignee: LG Energy Solution, Ltd.

( * ) Notice: Subject to any disclaimer, the term of this patent is extended or adjusted under 35 U.S.C. 154(b) by 160 days.

(21) Appl. No.: 17/417,916

(22) PCT Filed: Jul. 8, 2020

(86) PCT No.: PCT/KR2020/008964
§ 371 (c)(1),
(2) Date: Jun. 24, 2021

(87) PCT Pub. No.: WO2021/033920
PCT Pub. Date: Feb. 25, 2021

(65) Prior Publication Data
US 2022/0077613 A1 Mar. 10, 2022

(30) Foreign Application Priority Data
Aug. 20, 2019 (KR) .......................... 10-2019-0101972

(51) Int. Cl.
*H01R 12/58* (2011.01)
*H01R 12/72* (2011.01)
*H01R 12/70* (2011.01)

(52) U.S. Cl.
CPC ........... *H01R 12/724* (2013.01); *H01R 12/58* (2013.01); *H01R 12/7052* (2013.01)

(58) Field of Classification Search
CPC .. H01R 12/724; H01R 12/58; H01R 12/7052; H01R 12/7023; H01R 13/506;
(Continued)

(56) References Cited

U.S. PATENT DOCUMENTS 4,381,129 A * 4/1983 Krenz ................. H01R 12/594
439/106
4,678,121 A * 7/1987 Douty ................. H01R 12/728
439/83
(Continued)

FOREIGN PATENT DOCUMENTS

CN 1874071 A 12/2006
CN 101330185 A 12/2008
(Continued)

OTHER PUBLICATIONS

Search Report dated Mar. 3, 2022 from Office Action for Chinese Application No. 202080005598.7 dated Mar. 9, 2022. 3 pgs.
(Continued)

*Primary Examiner* — Truc T Nguyen
(74) *Attorney, Agent, or Firm* — Lerner David LLP (57) ABSTRACT

A connector including a housing mounted on a printed circuit board (PCB) and including a sidewall having an empty space that is open to one side and a fixing portion extending from an outer surface of the sidewall, the fixing portion passing through the PCB, a connection terminal having a part passing through the sidewall of the housing and the other part passing through the PCB and configured to be electrically connected to the PCB, and a connection unit including a terminal receiving portion and a coupling portion extending from an outer surface of the terminal receiving portion toward a position of the fixing portion to be mechanically coupled with a part of the fixing portion extending out of the PCB.

11 Claims, 10 Drawing Sheets

(58) Field of Classification Search
CPC .... H01R 2201/26; H01R 12/71; H01R 13/40; H01R 13/516; H01R 13/629; H01R 13/639; Y02E 60/10
See application file for complete search history.

(56) References Cited

U.S. PATENT DOCUMENTS

| | | | | |
|---|---|---|---|---|
| 6,599,136 | B2* | 7/2003 | Sheldon | H01R 12/727 439/92 |
| 8,286,879 | B2* | 10/2012 | Chang | G06K 19/07743 235/441 |
| 9,692,158 | B1 | 6/2017 | Vinther et al. | |
| 10,396,504 | B2* | 8/2019 | Sichmann | H01R 13/518 |
| 2002/0142627 | A1* | 10/2002 | Kameyama | H05K 3/325 439/67 |
| 2006/0270253 | A1 | 11/2006 | Skowranek | |
| 2007/0149006 | A1* | 6/2007 | Wu | H01R 12/721 439/78 |
| 2008/0108235 | A1 | 5/2008 | Muroi et al. | |
| 2009/0203237 | A1 | 8/2009 | Demonica et al. | |
| 2010/0112859 | A1* | 5/2010 | Olawsky | H01R 12/712 439/607.01 |
| 2013/0196547 | A1* | 8/2013 | Yokoyama | H01R 12/772 439/630 |
| 2017/0170600 | A1 | 6/2017 | Tezgurler | |
| 2017/0214187 | A1 | 7/2017 | Hwangbo | |
| 2018/0123266 | A1 | 5/2018 | Endo et al. | |
| 2019/0229450 | A1 | 7/2019 | Russo et al. | |
| 2021/0351531 | A1* | 11/2021 | Chen | H01R 13/642 |

FOREIGN PATENT DOCUMENTS

| | | |
|---|---|---|
| CN | 110061373 A | 7/2019 |
| JP | 200859761 A | 3/2008 |
| JP | 2008117707 A | 5/2008 |
| JP | 2011060484 A | 3/2011 |
| JP | 2019128977 A | 8/2019 |
| KR | 20080014087 A | 2/2008 |
| KR | 20160076334 A | 6/2016 |
| KR | 20170089515 A | 8/2017 |
| KR | 20180046886 A | 5/2018 |
| KR | 20190088887 A | 7/2019 |

OTHER PUBLICATIONS

International Search Report for Application No. PCT/KR2020/008964, dated Nov. 3, 2020, 3 pages.
Extended European Search Report including Written Opinion for Application No. 20855582.1 dated Jan. 17, 2022, pp. 1-7.

* cited by examiner

CONNECTOR

CROSS-REFERENCE TO RELATED APPLICATIONS

The present application is a national phase entry under 35 U.S.C. § 371 of International Application No. PCT/KR2020/008964 filed Jul. 8, 2020, published in Korean, which claims priority from Korean Patent Application No. 10-2019-0101972 filed Aug. 20, 2019, all of which are incorporated herein by reference.

TECHNICAL FIELD

The present disclosure relates to a connector, and more particularly, to a connector with reduced production cost and increased production efficiency.

BACKGROUND ART

Recently, rechargeable secondary batteries are widely used as a source of energy for wireless mobile devices. In addition, secondary batteries are gaining attention as a source of power for electric vehicles (EVs) and hybrid electric vehicles (HEVs) suggested to solve the air pollution issue of the traditional vehicles using fossil fuel such as gasoline vehicles and diesel vehicles.

Small mobile devices use at least one battery cell per device, while medium- and large-scale devices such as vehicles use a medium- and large-scale battery module including the plurality of battery cells electrically connected to each other to achieve high output and large capacity, and in some cases, a battery pack including a plurality of battery modules connected to each other is used.

It is desirable to manufacture the battery pack with smaller size and lower weight, and thus the battery pack primarily includes prismatic batteries and pouch-type batteries which can be stacked with high integrity and have lower weight to capacity.

For the battery pack to provide the output and capacity required for a predetermined device, it is necessary to electrically connect the plurality of battery cells in series or in parallel, or in a combination thereof. For example, the battery cells in the battery pack may be electrically connected in series or in parallel, or in a combination thereof by welding the electrode terminals to a plurality of busbars provided in the shape of a metal plate.

As the battery pack includes the plurality of battery cells, a sensing means is needed to sense the current generated from the battery cells to detect an overvoltage, an overcurrent or overheat in some battery cells. The sensing means is connected to each of the battery cells to provide voltage/current information of the battery cells to a battery management system (BMS).

The BMS may include a printed circuit board (PCB) having a printed circuit embedded therein. In addition, the BMS needs to include a connector mounted in the PCB to transmit and receive a signal to/from an external device or supply or receive power from the external device. The connector may be repeatedly assembled and disassembled with/from the counter connector, and thus it was necessary to firmly fix the connector onto the PCB.

In the conventional art, bolting is used to fix the connector to the PCB. That is, it is necessary to form a boss hole for bolting in the connector and a fastening hole for bolting in the PCB.

However, the bolting method needs to set the housing to a large size to form the boss hole. In addition, the boss hole places a big limitation on the housing structure. Moreover, it takes the material cost incurred in bolting and the process cost of the PCB, and bolting requires a very long time, resulting in an increase in production cost of the battery pack.

SUMMARY

Technical Problem

The present disclosure is designed to solve the above-described problem, and therefore the present disclosure is directed to providing a connector with reduced production cost and increased production efficiency.

These and other objects and advantages of the present disclosure can be understood by the following description, and will be apparent from the embodiments of the present disclosure. In addition, it will be readily appreciated that the objects and advantages of the present disclosure can be realized by means and combinations thereof.

Technical Solution

To achieve the above-described object, a connector according to the present disclosure includes a housing configured to be mounted on a printed circuit board (PCB) and including a sidewall having an empty space that is open to one side, and a fixing portion extending from an outer surface of the sidewall, the fixing portion configured to pass through the PCB; a connection terminal having a first part passing through the sidewall of the housing and a second part configured to pass through the PCB and configured to be electrically connected to the PCB; and a connection unit including: a terminal receiving portion having a first part inserted into the empty space of the housing, a remaining, second part extending out of the housing, and a plurality of connection holes into which a connection terminal of another connector is configured to be inserted; and a coupling portion extending from an outer surface of the terminal receiving portion toward the fixing portion, wherein the coupling portion is configured to be mechanically coupled with a part of the fixing portion extending out of the PCB when the fixing portion is passed through the PCB.

In addition, the fixing portion may include a fixing protrusion that is configured to be coupled to the coupling portion, extends downward from a bottom of the sidewall of the housing and linearly extends in a horizontal direction.

In addition, the coupling portion may include a pillar extending out downward from a bottom of the terminal receiving portion, and a hook extending from a lower end of the pillar and configured to extend toward the fixing protrusion when the fixing portion is passed through the PCB, wherein a first end of the hook is connected to the lower end of the pillar e and an opposite, second end of the hook is configured to be coupled to the fixing protrusion.

In addition, the coupling portion may include an adjuster extending outward from the lower end of the pillar and configured to face away from the fixing protrusion when the fixing portion is passed through the PCB, wherein the adjuster is configured to move the hook up and down.

In addition, the connection unit may include a cover portion extending downward from the bottom of the terminal receiving portion to cover the coupling portion.

In addition, the hook may include a guide protrusion that is configured to contact an outer surface of the PCB and extend out toward the fixing protrusion when the fixing portion is passed through the PCB.

In addition, part of the fixing protrusion may be configured to be inserted in between a protrusion of the hook and the guide protrusion.

In addition, the fixing protrusion may include an extension structure linearly extending leftwards and rightwards, and a side structure extending forwards and rearwards from left and right ends of the extension structure.

In addition, the hook may be configured to be hook-coupled to the extension structure of the fixing protrusion, the extension structure may include a coupling groove extending inwards, and the hook may include a fastening protrusion configured to be inserted into the coupling groove.

To achieve the above-described object, a printed circuit board assembly according to any of the embodiments the present disclosure includes the connector and a printed circuit board.

To achieve the above-described object, a battery pack according to the present disclosure includes the printed circuit board assembly.

Advantageous Effects

According to an aspect of the present disclosure, as the connector of the present disclosure includes the housing having the fixing portion extending from the outer surface of the sidewall and the fixing portion passes through the printed circuit board (PCB), it is possible to fix the housing to the PCB in a simple manner without a separate fixing element. Accordingly, it is possible to reduce the number of elements and simplify the production process, resulting in a lower production cost.

The connector of the present disclosure includes the coupling portion extending from the outer surface of the terminal receiving portion toward the position of the fixing portion to be coupled with the part extending out of the PCB of the fixing portion, and thus it is possible to fix the housing onto the PCB more firmly by mechanical coupling between the coupling portion of the connection unit and the fixing portion of the housing without using a separate fixing element.

According to an aspect of an embodiment of the present disclosure, the coupling portion of the present disclosure includes the pillar extending out downward from the bottom of the terminal receiving portion, and the hook extending from the lower end of the pillar toward the position of the fixing protrusion, with the end of the extended direction coupled to the fixing protrusion, thereby coupling the connection unit and the housing by simply male-female coupling in the front and rear direction between the two elements. Accordingly, it is possible to install the connector in the PCB in a simple manner and achieve firm coupling between the two elements.

According to an aspect of the present disclosure, as the hook has the guide protrusion that comes into contact with the outer surface of the PCB and extends out toward the position of the fixing protrusion, to guide the hook to move along the lower surface of the PCB without swaying, thereby performing the task of coupling the hook of the coupling portion to the fixing protrusion of the fixing portion of the housing easily and stably. Accordingly, it is possible to make it easier to perform the task of installing the connector in the PCB.

According to an aspect of the present disclosure, part of the fixing protrusion is configured to be inserted in between the hook and the guide protrusion, thereby further increasing the coupling strength between the fixing portion and the coupling portion, and the guide protrusion can prevent the connector from moving forwards and rearwards by an external force.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 1:
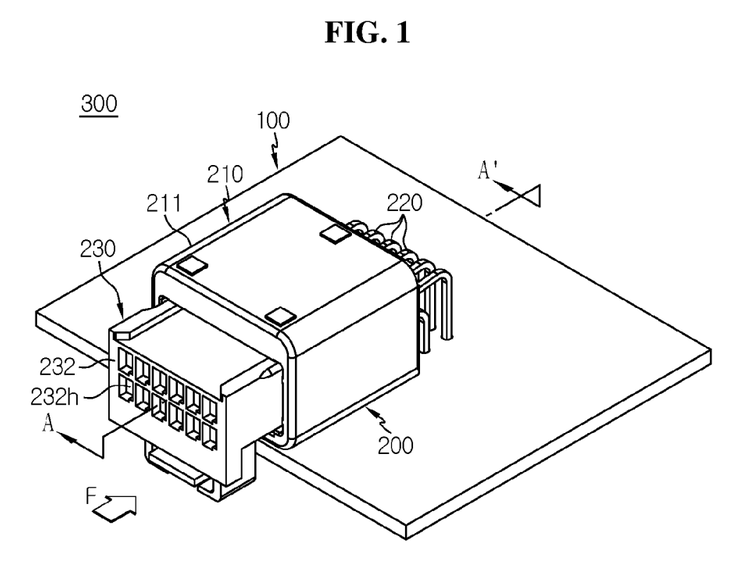
FIG. 1 is a schematic perspective view of a connector according to an embodiment of the present disclosure.
Figure 2:
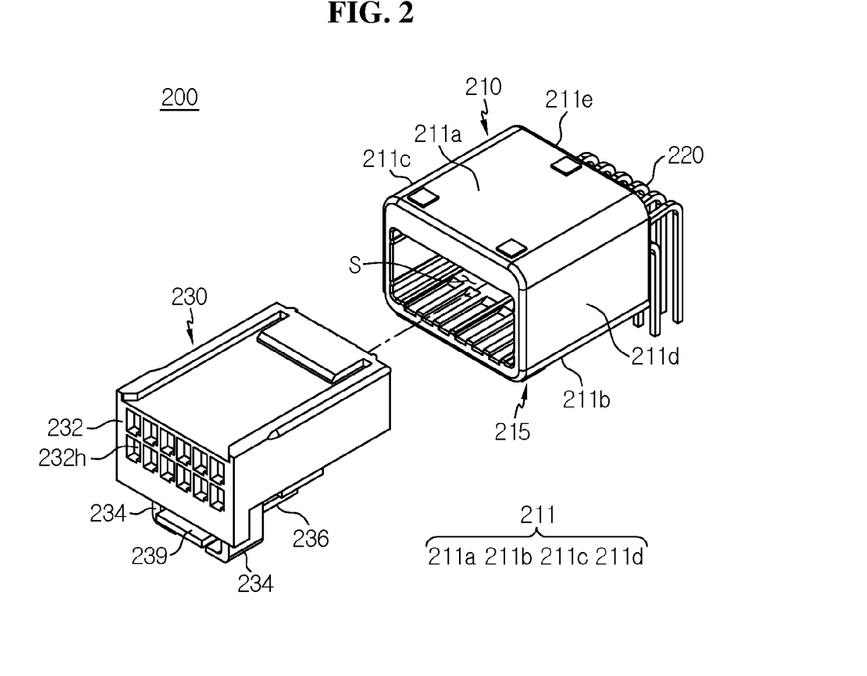
FIG. 2 is a schematic exploded perspective view of a connector according to an embodiment of the present disclosure.
Figure 3:
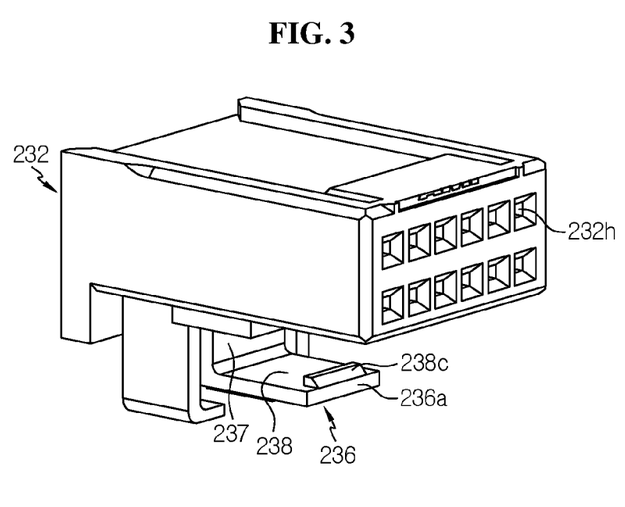
FIG. 3 is a schematic rear perspective view of some component of a connector according to an embodiment of the present disclosure.
Figure 4:
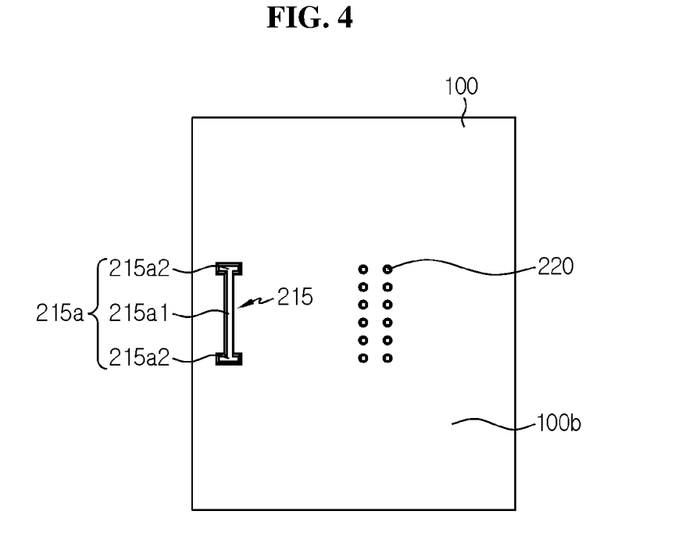
FIG. 4 is a schematic bottom view of some components of a connector according to an embodiment of the present disclosure.

FIG. 1 is a schematic perspective view of a connector according to an embodiment of the present disclosure. FIG. 2 is a schematic exploded perspective view of the connector according to an embodiment of the present disclosure. FIG. 3 is a schematic partial perspective view of the connector according to an embodiment of the present disclosure when viewed from the rear side. FIG. 4 is a schematic partial bottom view of the connector according to an embodiment of the present disclosure. For convenience of description, parts of a printed circuit board (PCB) 100 of FIG. 1 are illustrated. That is, the PCB 100 may be larger in size, and a larger number of devices and connectors may be mounted on the board.

Referring to FIGS. 1 to 4, the connector 200 according to an embodiment of the present disclosure includes a housing 210, a connection terminal 220 and a connection unit 230.

In detail, the housing 210 may be configured to be mounted on one surface of the PCB 100. For example, as shown in FIG. 1, the bottom of the housing 210 may be configured to be mounted on the upper surface of the PCB 100.

The housing 210 may have a sidewall 211 having an empty space S that is open to one side. In more detail, the sidewall 211 may include an upper sidewall 211a, a lower sidewall 211b, a left sidewall 211c, a right sidewall 211d and a rear sidewall 211e when viewed from the direction F. The housing 210 may have the empty space S that is open to the front.

The housing 210 may include an electrically insulating synthetic resin.

The housing 210 may include a fixing portion 215 that extends from the outer surface of the sidewall 211, and the fixing portion 215 may pass through the PCB 100. The end of the fixing portion 215 in the extending direction may pass through the PCB 100 and may be configured to extend further outwards than the other surface 100b of the PCB 100. That is, the housing 210 may be fixed to the PCB 100 by the fixing portion 215.

According to this configuration of the present disclosure, as the connector 200 of the present disclosure includes the housing 210 having the fixing portion 215 that extends from the outer surface of the sidewall 211, and the fixing portion 215 passes through the PCB 100, it is possible to fix the housing 210 to the PCB 100 in a simple manner without a separate fixing element. Accordingly, it is possible to reduce the number of elements and simplify the production process, resulting in a lower production cost.

Figure 5:
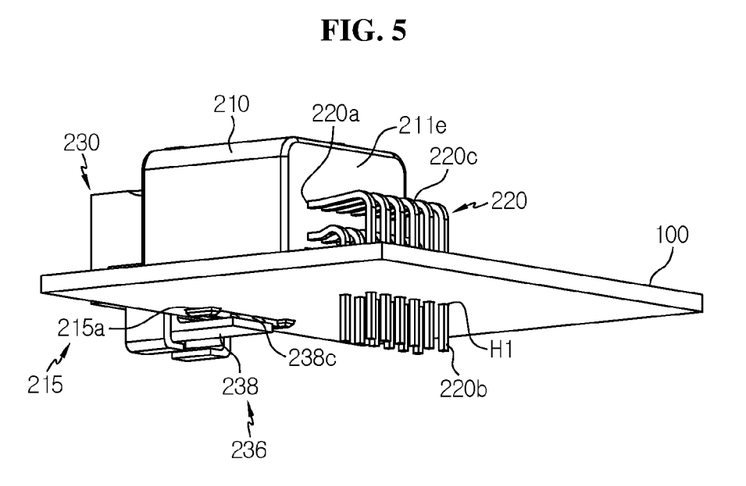
FIG. 5 is a schematic bottom perspective view of a connector according to an embodiment of the present disclosure when viewed from the rear side.

FIG. 5 is a schematic bottom perspective view of the connector according to an embodiment of the present disclosure when viewed from the rear side.

Referring to FIG. 5 together with FIG. 2, the connection terminal 220 may have a part 220a configured to pass through the sidewall 211 of the housing 210. The other part 220b that opposes the part 220a of the connection terminal 220 may pass through the PCB 100. The connection terminal 220 may have a downwardly bent structure 220c for electrical connection with the PCB 100. The other part of 220b of the connection terminal 220 may be inserted into a through-hole H1 provided in the PCB 100 and electrically connected to the circuit of the PCB 100 by soldering.

The connection terminal 220 may be configured to be connected to a connection terminal (not shown) of another connector (not shown). The connection terminal 220 may be a female connection terminal 220 or a male connection terminal 220. The connection terminal 220 may be in the form of a lead. For example, the connection terminal 220 of the present disclosure may be a female connection terminal, and a connection terminal of another connector may be a male connection terminal. On the contrary, the connection terminal 220 of the present disclosure may be a male connection terminal, and a connection terminal of another connector may be a female connection terminal. The connection terminal 220 may include an electrically conductive metal or alloy. For example, the metal may be nickel, copper and aluminum.

Referring to FIGS. 1 to 5, the connection unit 230 may include a terminal receiving portion 232 and a coupling portion 236.

In more detail, when viewed from the direction F, the terminal receiving portion 232 may be configured such that its part (the rear end) is inserted into and coupled with the empty space of the housing 210. In this instance, the terminal receiving portion 232 may be configured such that part of the connection terminal 220 may pass through the part of the terminal receiving portion 232 inserted inside the housing 210. For example, the terminal receiving portion 232 may have a connection hole 232h into which part of the connection terminal 220 is inserted.

For example, as shown in FIG. 2, part of the connection terminal 220 may pass through the rear end of the connection hole 232h of the terminal receiving portion 232. The connection hole 232h may run from the front end of the terminal receiving portion 232 to the rear end.

The remaining part of the terminal receiving portion 232 not inserted into the empty space S of the housing 210 may extend out of the housing 210. The front end of the connection hole 232h may be exposed to the outside to allow part of a connection terminal (not shown) of another connector (not shown) to be inserted into the remaining region of the terminal receiving portion 232.

That is, a connection terminal of another connector (not shown) may pass through the connection hole 232h of the terminal receiving portion 232 and may be connected (contact) to the connection terminal 220 of the connector 200 of the present disclosure.

For example, as shown in FIG. 5, the terminal receiving portion 232 may have 12 connection holes 232h. The part 220a of 12 connection terminals 210 may pass through the rear end of the 12 connection holes 232h.

Referring to FIG. 3 together with FIGS. 1 and 2, the coupling portion 236 may be configured to be mechanically coupled with the part extending out of the PCB 100 of the fixing portion 215. The coupling portion 236 may be configured to extend from the outer surface of the terminal receiving portion 232 toward the position of the fixing portion 215.

For example, the coupling portion 236 may extend downward from the bottom of the terminal receiving portion 232, and an end 236a extending downward may be bent and extend toward the position of the fixing portion 215. The bent and extended end 236a may be configured to be coupled with the fixing portion 215.

According to this configuration of the present disclosure, the present disclosure includes the coupling portion 236 extending from the outer surface of the terminal receiving portion 232 toward the position of the fixing portion 215 to be mechanically coupled with the part extending out of the PCB 100 of the fixing portion 215, and thus it is possible to fix the housing 210 onto the PCB 100 more firmly by mechanical coupling between the coupling portion 236 of the connection unit 230 and the fixing portion 215 of the housing 210 without using a separate fixing element.

Figure 6:
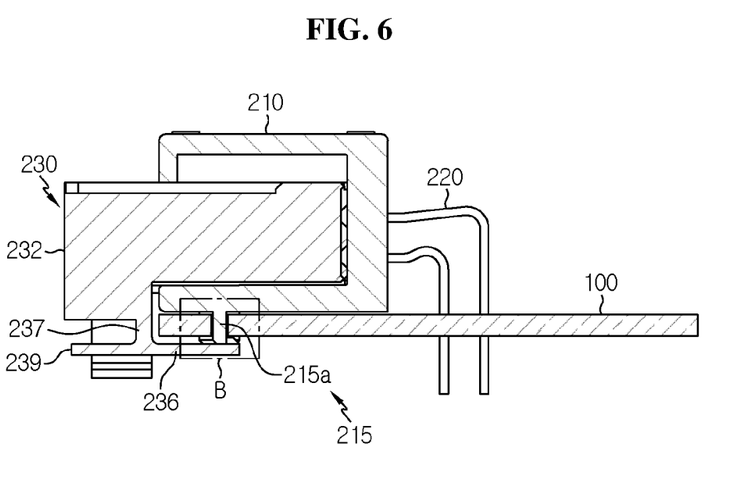
FIG. 6 is a schematic vertical cross-sectional view of a connector taken along the line A-A' of FIG. 1.
Figure 7:
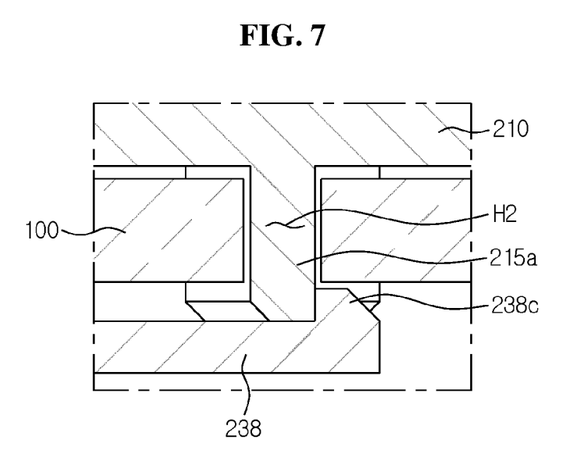
FIG. 7 is a schematic partial enlarged view of section B in FIG. 6.

FIG. 6 is a schematic vertical cross-sectional view of the connector taken along the line A-A' of FIG. 1. FIG. 7 is a schematic partial enlarged view of section B in FIG. 6.

Referring to FIGS. 6 and 7 together with FIGS. 2 and 4, the fixing portion 215 may have a fixing protrusion 215a configured to be coupled to the coupling portion 236. The fixing protrusion 215a may extend downward from the bottom of the sidewall 211 of the housing 210 and linearly extend in the horizontal direction.

When the PCB 100 has a fixing hole H2 that is open in the upward and downward direction, the fixing protrusion 215a may pass through the fixing hole H2. Part of the fixing protrusion 215a exposed to the outside through the fixing hole H2 may be configured to be mechanically coupled to the coupling portion 236 of the connection unit 230.

For example, as shown in FIGS. 4 and 7, the fixing portion 215 of the housing 210 may have the fixing protrusion 215a that is exposed to the outside through the PCB 100. In this instance, the fixing protrusion 215a may extend downward from the bottom of the sidewall 211 of the housing 210 and linearly extend in the horizontal direction. The housing 210 may be fixed onto the PCB 100 by the fixing protrusion 215a.

According to this configuration of the present disclosure, when the fixing portion 215 has the fixing protrusion 215a that is coupled to the coupling portion 236, extends downward from the bottom of the sidewall 211 of the housing 210 and linearly extends in the horizontal direction, the housing 210 may be fixed by the fixing protrusion 215a when simply mounted in the PCB 100. The housing 210 may have stable coupling with the connection unit 230 via simple mechanical coupling by the fixing protrusion 215a.

Referring to FIG. 5 together with FIG. 3, the coupling portion 236 may include a pillar 237 and a hook 238. In detail, the pillar 237 may extend out downward from the bottom of the terminal receiving portion 232. The pillar 237 may be in the shape of a plate having the area in the forward and rearward direction greater than the area in the leftward and rightward direction. The hook 238 may have a body that extends from the lower end of the pillar 237 toward the position of the fixing protrusion 215a. The hook 238 may have a protrusion 238c that extends upward at the end on the extended direction of the body to be coupled with the fixing protrusion 215a.

For example, as shown in FIG. 5, the coupling portion 236 may include the pillar 237 extending out downward from the bottom of the terminal receiving portion 232, and the hook 238 that extends from the lower end of the pillar 237 to the rear side where the fixing protrusion 215a is formed, and the end 236a of the hook 238 in the extended direction may be coupled to the fixing protrusion 215a. For example, as shown in FIG. 7, the end of a protrusion 238c extending upward from the hook 238 may be configured to press the rear surface of the fixing protrusion 215a forwards.

According to this configuration of the present disclosure, the coupling portion 236 may include the pillar 237 extending out downward from the bottom of the terminal receiving portion 232, and the hook 238 extending from the lower end of the pillar 237 toward the position of the fixing protrusion 215a, with the end 236a in the extended direction coupled to the fixing protrusion 215a, and thus it is possible to couple the connection unit 230 and the housing 210 by male-female coupling in the front and rear direction between the two elements. Accordingly, it is possible to install the connector 200 in the PCB 100 in a simple manner, and achieve firm coupling between the two elements.

Referring to FIGS. 6 and 7 together with FIG. 2, the coupling portion 236 may further include an adjuster 239 configured to move the hook 238 up and down. The adjuster 239 may extend out from the lower end of the pillar 237, facing away from the position of the fixing protrusion 215a. That is, the coupling portion 236 may have an upside down 'T' shape as a whole. When a user presses the adjuster 239 upwards and downwards, the rear end of the hook 238 may make a circular motion in the upward and downward direction around the lower end of the pillar 237 according to the lever principle. For example, as shown in FIG. 6, the coupling portion 236 may have the adjuster 239 extending out in the forward direction from the lower end of the pillar 237.

That is, when an operator holds and tightens the adjuster 239 and the top of the terminal receiving portion 232 with the hand, the hook 238 may go down, and in this state, when the connection terminal 220 is inserted into the empty space S of the housing 210, the protrusion 238c of the hook 238 may be disposed on the rear surface of the fixing protrusion 215a. When the operator pulls the hand away from the adjuster 239, the hook 238 and the fixing protrusion 215a may be coupled.

According to this configuration of the present disclosure, the coupling portion 236 may include the adjuster 239 extending out from the lower end of the pillar 237, facing away from the position of the fixing protrusion 215a to move the hook 238 up and down, to easily couple the connection unit 230 with the housing 210 mounted and fixed to the PCB 100, thereby easily performing the task of installing the connector 200 in the PCB 100.

Referring back to FIGS. 2 and 3, the connection unit 230 may include a cover portion 234. The cover portion 234 may be configured to cover the coupling portion 236. In detail, the cover portion 234 may extend downward from the bottom of the terminal receiving portion 232 of the connection unit 230. The downwardly extended end of the cover portion 234 may be bent and extend toward the adjuster 239 of the coupling portion 236 again.

For example, as shown in FIG. 2, the connection unit 230 may include the cover portion 234 that extends downward from the bottom of the terminal receiving portion 232 and is bent toward the adjuster 239.

According to this configuration of the present disclosure, the connection unit 230 may include the cover portion 234 extending downward from the bottom of the terminal receiving portion 232 to cover the coupling portion 236, to prevent the adjuster 239 from being obstructed by an external object, thereby preventing the coupling between the fixing portion 215 and the coupling portion 236 from being released. Accordingly, it is possible to prevent the release of the connection or the occurrence of a failure while the connector 200 is in use.

Figure 8:
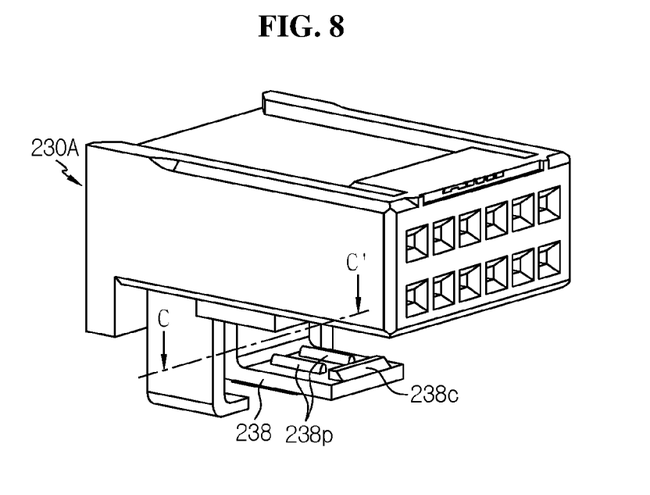
FIG. 8 is a schematic perspective view of some component of a connector according to another embodiment of the present disclosure when viewed from the rear side.
Figure 9:
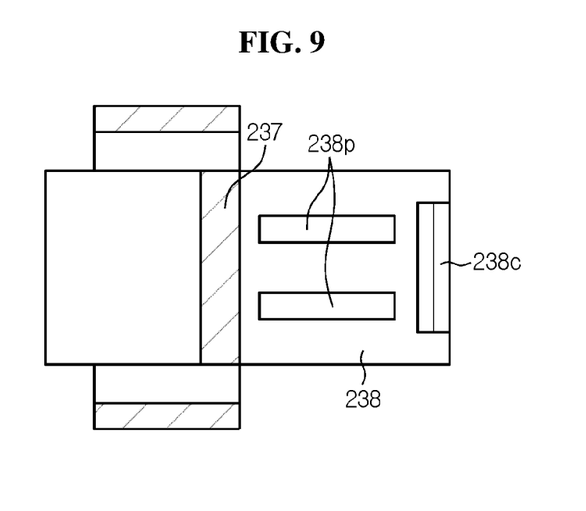
FIG. 9 is a schematic partial horizontal cross-sectional view of a connector taken along the line C-C' of FIG. 8.

FIG. 8 is a schematic partial perspective view of a connector according to another embodiment of the present disclosure when viewed from the rear side. FIG. 9 is a schematic partial horizontal cross-sectional view of the connector taken along the line C-C' of FIG. 8.

Referring to FIGS. 8 and 9, a connection unit 230A according to another embodiment may include a hook 238 having a guide protrusion 238p that comes into contact with the outer surface of the PCB 100 and extends out toward the position of the fixing protrusion 215a. The upper surface of the body of the hook 238 may have a guide protrusion 238p that extends upwards and linearly extends in the forward and rearward direction. The guide protrusion 238p may be configured to guide the hook 238 to move along the outer surface of the PCB 100. For example, as shown in FIG. 9, the hook 238 of the coupling portion 236 may have two guide protrusions 238p.

According to this configuration of the present disclosure, the hook 238 has the guide protrusion 238p that comes into contact with the outer surface of the PCB 100 and extends out toward the position of the fixing protrusion 215a, to guide the hook 238 to move along the lower surface of the PCB 100 without swaying, thereby performing the task of coupling the hook 238 of the coupling portion 236 to the fixing protrusion 215a of the fixing portion 215 of the housing 210 easily and stably. Accordingly, it is possible to make it easier to perform the task of installing the connector in the PCB.

Referring back to FIGS. 8 and 9, part of the fixing protrusion 215a may be configured to be inserted in between the hook 238 and the guide protrusion 238p. That is, the fixing protrusion 215a may be configured to be inserted into a horizontal spacing between the hook 238 and the guide protrusion 238p. For example, as shown in FIG. 9, part of the fixing protrusion 215a may be configured to be inserted into the spacing between the protrusion 238c of the hook 238 and the two guide protrusions 238p.

According to this configuration of the present disclosure, part of the fixing protrusion 215a is configured to be inserted in between the hook 238 and the guide protrusion 238p, and thus it is possible to further increase the coupling strength between the fixing portion 215 and the coupling portion 236, and the guide protrusion 238p can prevent the connector 200 from moving forwards and rearwards by the external force.

Referring back to FIGS. 2, 4 and 5, the fixing protrusion 215a may include an extension structure 215a1 and a side structure 215a2. The extension structure 215a1 may linearly extend leftwards and rightwards. The side structure 215a2 may extend forwards and rearwards from the left and right ends of the extension structure 215a1.

For example, as shown in FIG. 2, the fixing protrusion 215a may have the extension structure 215a1 extending leftwards and rightwards and the side structure 215a2 linearly extending forwards and rearwards. As shown in FIG. 4, the bottom of the extension structure 215a1 and the side structure 215a2 of the fixing protrusion 215a may extend downward through the PCB 100. The extension structure 215a1 of the fixing protrusion 215a may serve as a stopper to hold the hook 238 of the coupling portion 236.

For example, a strong frictional force takes place between the side structure 215a2 linearly extending forwards and rearwards and a fixing hole (not shown) provided in the PCB 100, thereby preventing the housing 210 fixed to the PCB 100 by the fixing protrusion 215a from moving in the forward and rearward direction due to an external force in the forward and rearward direction. Further, the side structure 215a2 may serve as a stopper to prevent the protrusion 238c of the hook 238 moving forwards and rearwards, or going away due to the external force coupled to the connection structure.

According to this configuration of the present disclosure, the fixing protrusion 215a has the extension structure 215a1 linearly extending leftwards and rightwards and the side structure 215a2 extending forwards and rearwards from the left and right ends of the extension structure 215a1, to stably keep the housing 210 in fixed state on the PCB 100. The fixing portion 215 and the coupling portion 236 may be held together more tightly by the side structure 215a2.

Figure 10:
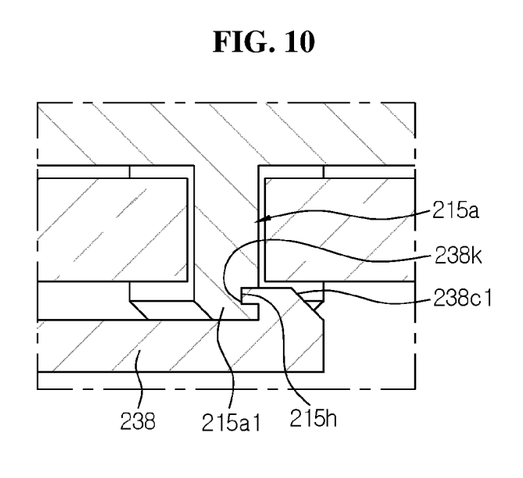
FIG. 10 is a schematic partial enlarged view of a connector according to another embodiment of the present disclosure.

FIG. 10 is a schematic partial enlarged view of the connector according to another embodiment of the present disclosure.

When comparing the connector of FIG. 10 with the connector 200 of FIG. 7, except that the fixing portion 215 has a coupling groove 215h and the hook 238 of the coupling portion 236 has a fastening protrusion 238k, the remaining configuration is the same as the connector of FIG. 7. Accordingly, a detailed description of the connector 200 is omitted herein below.

Referring to FIG. 10 together with FIG. 4, the hook 238 may be configured to be coupled to the extension structure 215a1 of the fixing protrusion 215a. The coupling groove 215h extending inwards may be provided in the extension structure 215a1. The hook 238 may have the fastening protrusion 238k configured to be inserted into the coupling groove 215h. For example, as shown in FIG. 10, the extended end of the hook 238 may have a protrusion 238c1 extending upwards, and the protrusion 238c1 may further include the fastening protrusion 238k extending forwards from a surface in contact with the extension structure 215a1 of the fixing protrusion 215a. The coupling groove 215h extending inwards may be provided in the extension structure 215a1 of the fixing protrusion 215a. The coupling groove 215h may have an inner size enough for the fastening protrusion 238k to be fitted and fixed.

According to this configuration of the present disclosure, the coupling groove 215h extending inwards may be provided in the extension structure 215a1 and the hook 238 may have the fastening protrusion 238k configured to be inserted into the coupling groove 215h, thereby effectively increasing the coupling strength between the coupling portion 236 and the fixing portion 215. Furthermore, the fastening protrusion 238k may effectively prevent the hook 238 coupled with the fixing protrusion 215a from being decoupled.

In addition, a PCB assembly 300 according to the present disclosure includes the connector 200 and the PCB 100 having the printed circuit embedded therein (not shown). The PCB assembly 300 may further include a counter connector (not shown) that is coupled with the connector 200.

Further, a battery pack according to the present disclosure includes a battery module (not shown) including a plurality of secondary batteries, and the PCB assembly 300. That is, the battery pack according to the present disclosure may include the PCB assembly 300 to control the charge/discharge of the battery module.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

[Description of Reference Numerals]

| | |
|---|---|
| 200: Connector | 100: Printed circuit board |
| 210: Housing | 211: Sidewall |
| 215: Fixing portion | 215a: Fixing protrusion |
| 220: Connection terminal | |
| 230: Connection unit | 232: Terminal receiving portion |
| 232h: Connection hole | 236: Coupling portion |
| 237, 238: Pillar, Hook | 239: Adjuster |
| 234: Cover portion | 238p: Guide protrusion |
| 215a1, 215a2: Extension structure, Side structure | |
| 215h: Coupling groove | 238k: Fastening protrusion |

INDUSTRIAL APPLICABILITY

The present disclosure relates to a connector. In addition, the present disclosure can be used in the industry related to a battery pack including the connector.

What is claimed is:

1. A connector comprising:
a housing configured to be mounted on a printed circuit board (PCB) and including a sidewall having an empty space that is open to one side, and a fixing portion extending from an outer surface of the sidewall, the fixing portion configured to pass through the PCB;
a connection terminal having a first connection terminal part passing through the sidewall of the housing and a second connection terminal part configured to pass through the PCB and configured to be electrically connected to the PCB; and
a connection unit including:
a terminal receiving portion having a first terminal receiving part inserted into the empty space of the housing, a second terminal receiving part extending out of the housing, and a plurality of connection holes into which a connection terminal of a second connector is configured to be inserted; and
a coupling portion extending from an outer surface of the terminal receiving portion toward the fixing portion, wherein the coupling portion is configured to be mechanically coupled with a part of the fixing portion extending out of the PCB when the fixing portion is passed through the PCB.

2. The connector according to claim 1, wherein the fixing portion includes a fixing protrusion that is configured to be coupled to the coupling portion, extends downward from a bottom of the sidewall of the housing and linearly extends in a horizontal direction.

3. The connector according to claim 2, wherein the coupling portion includes:
a pillar extending out downward from a bottom of the terminal receiving portion; and
a hook extending from a lower end of the pillar and configured to extend toward the fixing protrusion when the fixing portion is passed through the PCB, wherein a first end of the hook is connected to the lower end of the pillar and an opposite, second end of the hook is configured to be coupled to the fixing protrusion.

4. The connector according to claim 3, wherein the coupling portion includes an adjuster extending outward from the lower end of the pillar and configured to face away from the fixing protrusion when the fixing portion is passed through the PCB, wherein the adjuster is configured to move the hook up and down.

5. The connector according to claim 4, wherein the connection unit includes a cover portion extending downward from the bottom of the terminal receiving portion to cover the coupling portion.

6. The connector according to claim 4, wherein the hook includes a guide protrusion that is configured to contact an outer surface of the PCB and extend out toward the fixing protrusion when the fixing portion is passed through the PCB.

7. The connector according to claim 6, wherein part of the fixing protrusion is configured to be inserted in between a protrusion of the hook and the guide protrusion.

8. The connector according to claim 3, wherein the fixing protrusion includes:
an extension structure linearly extending leftwards and rightwards; and
a side structure extending forwards and rearwards from left and right ends of the extension structure.

9. The connector according to claim 8, wherein the hook is configured to be hook-coupled to the extension structure of the fixing protrusion,
the extension structure includes a coupling groove extending inwards, and
the hook includes a fastening protrusion configured to be inserted into the coupling groove.

10. A printed circuit board assembly comprising:
the connector according to claim 1; and
the PCB.

11. A battery pack comprising the printed circuit board assembly according to claim 10.

* * * * *